Nov. 18, 1924.  
C. I. DICKERSON  
TRAFFIC TRANSMISSION MACHINE  
Filed April 30, 1924  
1,516,088
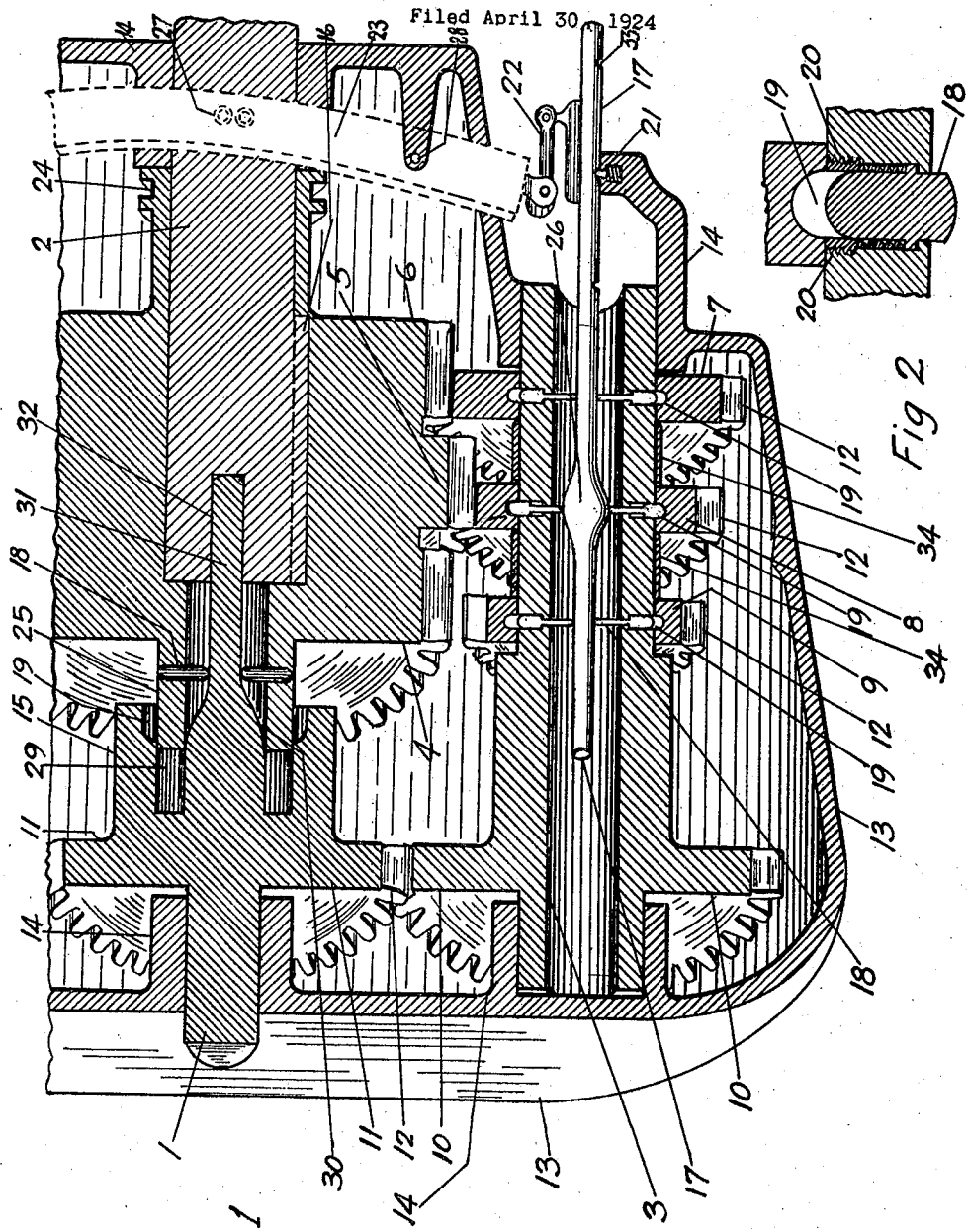
INVENTOR.  
Charles I. Dickerson Patented Nov. 18, 1924.

1,516,088

UNITED STATES PATENT OFFICE.

CHARLES I. DICKERSON, OF DUCHESNE, UTAH.

TRAFFIC TRANSMISSION MACHINE.

Application filed April 30, 1924. Serial No. 710,141.

*To all whom it may concern:*

Be it known that I, CHARLES I. DICKERSON, a citizen of the United States, residing at Duchesne, in the county of Duchesne and State of Utah, have invented a new and useful Traffic Transmission Machine, of which the following is a specification.

My invention relates to improvements in engines driven by any kind of power in which the speed gears are of variable dimensions, and the objects of my improvement are, first, to provide a continuous enmeshment of the varying speed gears; and, second, to afford facilities for the proper adjustment of all parts necessary for engaging such speed gears, independently of each other, and changing the speed thereof, or rendering all gears neutral.

I attain these objects by the mechanism illustrated in the accompanying drawing, in which—

Figure I is a horizontal cross section of a part of the mechanism, and

Figure II is an enlarged view of the thrust bolts or pins and the pockets or recesses in which they are engaged. Similar numerals refer to similar parts.

In Plate or Fig. I, the drive shaft (1) is so formed that (11) is an annular rib or gear; (15) is a clutch pocket to receive the horizontally projecting hub (25), of the gears (4—5—6). The main driving shaft (1) extending horizontally beyond and through the clutch pocket (29) by ellipsoidal reduction (30) is reduced in diameter and thence extends horizontally, of uniform diameter (31), so that it may enter horizontally the receptacle (32), in the horizontal differential shaft (2).

The main gears (4—5—6) being in one piece, forms three gears of varying diameter, and a single hub, the hub projecting beyond the gears at both ends, the end (25) forms part of the clutch pocket above mentioned, and the other end contains the annular groove or channel (24) for engaging a fork (not shown) which fork is secured to the control lever (23) at point (27). The said piece, or gears (4—5—6), and the driven shaft (2) are keyed together by the rectangular spline (16), along which the main gears move longitudinally, when forced forward or backward by control lever (23). The cogs (12) on 4—5—6, are double the width of cogs (12) in 7—8—9, to allow this longitudinal movement and keep enmeshed the gears. The entire gear piece keyed by spline to the driven shaft (2) when moved forward, engages the clutch on driving shaft (1) and all gears are in neutral.

The three gears (7—8—9) revolve, each independently around the horizontal hollow axle or counter shaft (3), and are engaged when in use, by being keyed to the hollow counter-shaft (3), by the thrust pins (18) passing into the recesses (19), which recesses are as many and as close as possible and in a line encircling the inner centers of the hubs of gears (7—8—9), there being as many thrust pins as desired. These thrust pins are pushed into the recesses (19), by the thrust key (17) being moved horizontally forward or backward by the control lever (23), and bringing the prolate ellipsoid (26) of thrust key (17) and the thrust pins in contact. The thrust pins are held from entering the recess (19) by the springs (20) when not engaged.

The thrust key (17) is operated horizontally through the hollow counter shaft (3) by the control lever (23) by means of the connecting link (22). The fulcrum of the control lever being at (28) where it is attached to the housing (13) for a bearing.

Power is transmitted from the main driving shaft (1) to the hollow counter shaft (3) by means of the gears (10) and (11) which intermesh at (12). Gear (10) is a part of the hollow counter shaft (3). Figures (14) are the journal bearings or boxings of the several parts mentioned. Figures 12 are intermeshing cogs but it will be noticed that transmission gears (4) and (9) do not intermesh, but are used in connection with gears not shown, and which operate the reverse gear which is not a part of this invention. (21) is a spring under a lock pin which holds the pin in the notch (33) to hold thrust key (17) in position. (27) are bolts holding the fork in place. Fork not shown but it is the usual method of engaging a fork attached to a control lever with the annular groove (24).

In the drawings, Fig. I, the prolate ellipsoid (26) is engaged with thrust pin (18) which pin is thrust or forced into recess (19), gear (8), which places the mechanism in what is low gear. To change gear to intermediate, or second gear, the control lever (23) is pushed forward by the operator. This movement disengages the gears putting the mechanism in neutral. Pushing the control lever further forward draws the thrust key (17) horizontally back and engages the ellipsoid (26), with the thrust pin (18), forcing said pin into the recess (19) in gear (7), throwing the mechanism into intermediate or second gear. From intermediate gear, into high, the control lever is pushed still further forward, and by a slight side movement it throws the fork, which is attached at (27) on the control lever, into the annular groove (24), and by still further pushing the control lever forward, the entire gear-piece, with the hub extensions, is moved forward horizontally, engaging the hub projections (25) into recess (29) formed by the collar (15). In so engaging the thrust pins (18) are pushed into the recesses (19) of the main driving shaft (1) by reason of the tapering of said drive shaft at (30). When so engaged, the mechanism is in what is termed high, or a direct transmission of power, through the main driving shaft (1), engaged with the driven shaft (2).

For reversing the mechanism, the movement of the control lever and the operation of the several parts will be apparent, but is not shown in the drawing, except where the engaging of the prolate ellipsoid (26), and the thrust pin (18), and the recess (19) in gear (9) occur.

Fig. 2 is an enlarged view of thrust pin (18), the recess (19), and the holding spring (20), mentioned in describing Fig. 1. The ends of the thrust pin (18) may be spherical or conical, and the recesses (19) to correspond. Numerals 13 denote the housing which may be in any form suitable to cover the mechanism. (14) denotes bearings or boxing (33) recesses to hold thrust key (17) in position.

I claim:

1. The combination in a power driven machine, having varying speed gears; a driving shaft having a fixed gear, a clutch pocket having recesses and a horizontal shaft extension through and beyond the clutch pocket; an ellipsoidal reduction in said shaft extension; a driven shaft in alignment with said drive shaft; gears of varying diameter thereon having a hub, one end extended beyond the gears to enter the clutch pocket mentioned and carrying radially extensible pins adapted to enter the recesses; the other end of said hub extended beyond the gears and provided with an annular groove to receive the engaging fork of a control lever, said pins operated by the ellipsoidal reduction of the shaft extension; a hollow counter shaft, upon which revolve gears, each gear revolving independently; radial thrust pins carried by the counter shaft, which engage said counter gears; a prolate ellipsoidal thrust bolt operating in said hollow shaft to actuate said thrust pins substantially as set forth.

2. In a power driven machine having varying speed gears, a one piece driving shaft having a fixed gear, a clutch pocket having recesses and a horizontal shaft extension through and beyond the clutch pocket, and ellipsoidal reduction in said shaft extension, in combination with, and in alignment with said drive shaft; a driven shaft having gears of varying diameter thereon; a hub, one end extended beyond the gears to enter the clutch pocket mentioned, and carrying radially extensible pins adapted to enter the recesses, the other end of said hub extended beyond the gears, and provided with an annular groove to receive the engaging fork of a control lever, said pins operated by the ellipsoidal reduction of the shaft extension, substantially as set forth, and for the uses mentioned.

CHARLES I. DICKERSON.